United States Patent [19]

Oguchi

[11] Patent Number: 4,459,676

[45] Date of Patent: Jul. 10, 1984

[54] PICTURE IMAGE PRODUCING APPARATUS

[75] Inventor: Tetsuji Oguchi, Tokyo, Japan

[73] Assignee: Nippon Electric Co., Ltd., Tokyo, Japan

[21] Appl. No.: 275,206

[22] Filed: Jun. 18, 1981

[30] Foreign Application Priority Data

Jun. 18, 1980 [JP] Japan .................................. 55-82484

[51] Int. Cl.³ ......................... G06F 3/13; G06F 3/153; G06F 15/20

[52] U.S. Cl. ...................................... 364/521; 364/520

[58] Field of Search ............... 364/520, 521, 522, 720; 340/747

[56] References Cited

U.S. PATENT DOCUMENTS

| | | | |
|---|---|---|---|
| 3,761,765 | 9/1973 | Machin et al. | 340/747 |
| 3,789,200 | 1/1974 | Childress et al. | 364/521 |
| 3,987,284 | 10/1976 | Hogan et al. | 364/521 |
| 3,996,673 | 12/1976 | Vorst et al. | 364/521 |
| 4,371,933 | 2/1983 | Bresenham et al. | 364/720 X |

FOREIGN PATENT DOCUMENTS

| | | | |
|---|---|---|---|
| 54-116141 | 10/1979 | Japan | 364/720 |

OTHER PUBLICATIONS

Kulpa: On the Properties of Discrete Circles, Rings, and Disks, Computer Graphics and Image Processing, vol. 10, No. 4, Aug. 1979, pp. 348–365.

Doros: Algorithms for Generation of Discrete Circles, Rings, and Disks, Computer Graphics and Image Processing, vol. 10, No. 4, Aug. 1979, pp. 366–371.

Bresenham: A Linear Algorithm for Incremental Digital Display of Circular Arcs. Communications of the A C M, vol. 20, No. 2, Feb. 1977, pp. 100–106.

Pitteway: Algorithm for Drawing Ellipses or Hyperbolae with a Digital Plotter. The Computer Journal, vol. 10, No. 3, Nov. 1967, (British Computer Society–London), pp. 282–289.

Jordan et al.: An Improved Algorithm for the Generation of Nonparametric Curves. IEEE–Transactions on Computers, vol. C–22, No. 12, Dec. 1973, pp. 1052–1060.

*Primary Examiner*—Felix D. Gruber
*Attorney, Agent, or Firm*—Laff, Whitesel, Conte & Saret

[57] ABSTRACT

A picture image producing apparatus has a control unit for designating picture image calculation, a display unit for displaying a picture image, and a processing unit for storing standard information used in the picture image calculation. The standard information is x-coordinate data and y-coordinate data of the picture image to be displayed. A first calculator computes a first group information of the picture image, in response to vary the x-coordinate data of the standard information. A second calculation computes second group information of the picture image in response to the varying y-coordinate data of the standard information. The picture image information of the first and second group information is transferred to the display unit.

7 Claims, 15 Drawing Figures

PICTURE IMAGE PRODUCING APPARATUS

The present invention relates to an image producing apparatus including an image (pattern) processing apparatus and a display apparatus for displaying an image (pattern) on the basis of the processed information. More particularly, it relates to an image producing apparatus for producing an image including, at least in part, a curved line.

In recent years, techniques have been developed for producing an image such as a character, figure or the like by combining a digital processing apparatus (for example, a digital computer, micro-processor, personal computer, etc.) and a display apparatus (for example, a cathode ray tube (CRT), printer, X-Y plotter, etc.). Consequently, applications for digital data processors have greatly expanded. Applications employing pattern processing, such as statistics, stock control, design of circuits or the like have been especially facilitated. Production of a complex pattern has been attempted by making use of data processors having a high degree of calculation capability such as multiplication, division or function calculation. The term "complex pattern" as used herein means a pattern that is either partly or wholly formed of a curved line, and for instance, as typical patterns, they include an arc and a circle.

The image producing apparatus in the prior art are generally classified into, as described below two types. Both types of the prior art apparatus involve too complex facilities requiring a long period for calculation such as multiplication, division, and function calculators, etc.. Consequently, it has been impossible to produce data for display at a high speed using either types of apparatus. However, these complex facilities were essential to the prior art apparatus, and hence it was impossible to shorten the time for producing the data of an image such as a circle pattern, etc.. Further, the required data processing apparatus with multiplication, division and function calculation capability is expensive.

In the following, the control system in the prior art for processing image data will be set forth and the shortcomings as referred to above will be made clear.

The first type of apparatus in the prior art uses the equation of a circle $x^2+y^2=r^2$ to plot a circle. In this case, either an x-coordinate or a y-coordinate is used as a reference. The reference coordinate is varied by one coordinate unit (one dot unit of the plotting) and the values of the y-coordinates or x-coordinates at the respective plot points are calculated. As a result, all the points on the circle to be plotted are calculated with respect to their dot positions on a display. A more detailed description thereof will be given as follows.

In the case of producing a circle having center coordinates (h, k) and a radius r, a point (h+r, k) is determined as a plot starting point. Then, the y-coordinates of the successive plot points are calculated while successively reducing the x-coordinate by a predetermined value (for example, one unit). That is, the x-coordinate is successively reduced by the predtermined value from (h+r) to (h−r) in the following manner:

$$x_n=h+r,\ (h+r)-1,\ (h+r)-2,\ \ldots,\ h,\ \ldots\ h-(r-1),\ h-r \qquad (1)$$

Then, for each value of the x-coordinates $x_n$, the y-coordinate can be calculated by the following equation:

$$y_n=\pm\sqrt{r^2-(x_n-h)^2}+k \qquad (2)$$

In this first type of apparatus, as will be apparent from Equation (2) above, two integer multiplications, one real number square root calculation and three integer additions/substractions are necessary for calculating one y-coordinate. Therefore, a lengthy calculation making use of a multiplier circuit, a square root calculation circuit and an adder/subtractor circuit is necessary. Therefore, the apparatus has a shortcoming in that its plotting speed is extremely slow. Moreover, only the x-coordinate (or the y-coordinate) is used as a reference and the corresponding y-coordinate (or x-coordinate) is calculated on the basis of Equation (2) above. The apparatus has another shortcoming in that the intervals between adjacent dots on the circle are broader in the angular ranges of 0 degrees to 45 degrees, 135 degrees to 225 degrees and 315 degrees to 360 degrees (0 degrees). Hence, the plotting precision and the quality of the plotted circle are degraded in these ranges.

The second type of the prior art apparatus uses mathematical equations including trigonometric functions to plot each point in the circle. In such a system both x-coordinates and y-coordinates of dots to be plotted at a predetermined interval are respectively determined by calculation. The calculations are effected in the following manner.

With regard to a circle having center coordinates (h, k) and a radius r, the respective points ($x_n$, $y_n$) on the circle are defined by the following equations:

$$x_n=r\cdot\cos\theta_n+h \qquad (3)$$

$$y_n=r\cdot\sin\theta_n+k \qquad (4)$$

The angle $\theta_n$ is varied 360 times from 0 degrees to 360 degrees and the x-coordinate and y-coordinate are calculated from Equations (3) and (4), above, upon each variation of the angle $\theta_n$.

In this type of plotting apparatus, two real number trigonometric function calculations, two real number multiplications and two integer additions are necessary. Accordingly, as with the first plotting apparatus, the second one also requires a long plotting period. Conceivably, an attempt to shorten the plotting period, might be accomplished by storing a trigonometric function table in a memory unit to thereby carry out the two real number trigonometric function calculations by making reference to the stored table. However, for the function table, a large-capacity memory is necessary and so, this modified system is expensive and lacks flexibility. Moreover, in either case, two lengthy real number multiplications are necessary. The calculation period is also long. In addition, since it is necessary to provide a multiplication circuit for that purpose, the hardware circuit in the data processing apparatus is somewhat complex.

In this second type of the apparatus, an angular increment is used as a unit of variation of a plotting position of a dot. The intervals between the dots plotted on a circle are uniform as long as the radius is kept constant. Accordingly, in the second type of apparatus a means must be provided for appropriately selecting the angular increment according to the value of the radius. Otherwise, regardless of the value of the radius of a circle, that is, whether the radius may be 1 or 1000, the number of dots to be plotted on a circle would be equal. Accordingly, in the case of a small radius, the dots at the same coordinate position will overlap. On the contrary, in the case of a greater radius the intervals between adjacent dots are overly expanded and separated.

As described above, these two types of apparatus in the prior art require complex hardware circuits such as multiplier circuits, square root calculation circuits, etc. for processing the calculations which produce dot information forming a circle on display. A complete description of these circuit constructions is omitted here. However, it is well known that multiplication, division and square root calculations take several tens of times as long as the calculation time for addition or subtraction. This is a great shortcoming of the prior art apparatuses.

Therefore, one object of the present invention is to provide an image producing apparatus which can more smoothly plot a curved line portion, to be produced by digital processing.

Another object of the present invention is to provide a pattern producing apparatus which can plot a smooth curve by employing simple digital calculations.

Still another object of the present invention is to provide an image producing apparatus comprising a digital data processing unit and a display unit in combination, using simplified display control hardware.

A still further object of the present invention is to provide an image producing apparatus with a simplified fraction calculation system that is suitable for digital processing.

Yet another object of the present invention is to provide an image producing apparatus in which curve information can be derived by making use of circuits capable only of addition and subtraction.

A still further object of the present invention is to provide an image producing apparatus in which data to be plotted to produce a circle on a rectangular coordinate system (x-y coordinate system) can be produced by digital processing.

According to one feature of the present invention, an image producing apparatus comprises a control unit for designating image calculation, a display unit for displaying an image, and a processing unit including means for storing standard information used in the image calculation. The standard information is x-coordinate data and y-coordinate data of the image to be displayed. A first calculator means is used for computing a first group of information of the image in order to vary the x-coordinate data of the standard information. A second calculation means is used for computting a second group of information of the image in order to vary the y-coordinate data of the standard information. A means is also provided for transfering image information of the first and second group information to the display unit.

Accordingly, the present invention prepares image information for plotting a display, for example, a circle having a radius r and its center located at a point of coordinates (h, k) or at least a part of a circle (a circular arc). The display surface is divided, with respect to a reference radial line extending from the center point (h, k) parallel to the x-axis in its positive direction. A first region covers an angular extension of 0°~45°. A second region covers an angular extension of 45°~135°. A third region covers an angular extension of 135°~225°. A fourth region covers an angular extension of 225°~315°. A fifth region covers an angular extension of 315°~360°, in the counterclockwise direction.

When the above-mentioned circle is to be plotted over the above-referred first and fifth regions, a plot start point (h+r, k) is stored in the storage means as the standard information. While the y-coordinate value is successively varied by a predetermined value, the x-coordinate value of the corresponding point on the circle is calculated in the first calculator means. When the circle is to be plotted over the above-mentioned second region, another plot start point (h, k+r) is stored in the storage means as the successive standard information. While the x-coordinate value is successively varied by a predetermined value, the y-coordinate value of the corresponding point on the circle is calculated in the second calculator means. When the circle is to be plotted over the abovementioned third region, a still another plot start point (h−r, k) is stored in the storage means, as has the previous information. While the y-coordinate value is successively varied by a predetermined value, the x-coordinate value of the corresponding point on the circle is calculated by the first calculator means. In addition, when the circle is to be plotted over the aforementioned fourth region, yet another set of standard information (h, k−r) is stored in the storage means as has been the other standard information. While the x-coordinate value is successively varied by a predetermined value, the y-coordinate value of the corresponding point on the circle is calculated by the second calculator means.

The information obtained as a results of the above procedures is compiled and stored in a memory or registers. The y-coordinate value (or x-coordinate value) calculated when the x-coordinate value (or y-coordinate value) is varied, is normalized into an integer datum by rounding the value of the y-coordinate (or x-coordinate) obtained from the equation of a circle $(x-h)^2+(y-k)^2=r^2$.

Here, the term "coordinate" means an x-y value in a rectangular coordinate system when the image is plotted on a plane. When the coordinate data (x, y) is on a raster scan type (CRT) display surface, for example, one can consider that the n-th vertical scanning corresponds to the x-coordinate data and the m-the horizontal scanning corresponds to the y-coordinate data. In the subsequent step, dots are marked at the respective positions (picture elements) on the display surface corresponding to the image data representing a circle, or a circular arc which are stored in the memory such as a video RAM. Thus, a desired pattern of a circle or a circular arc can be displayed.

According to the present invention, the image producing apparatus is preset for the circular arcs to be plotted in the above-referred first, third and fifth regions. The x-coordinate is calculated as a function of the y-coordinate selected as a reference coordinate. For the circular arcs to be plotted in the above-referenced second and fourth regions, the y-coordinate is calculated as a function of the x-coordinate selected as a reference coordinate. Accordingly, in this apparatus the intervals between adjacent display dots generated by the present invention would not be as largely varied as the dots generated by the first prior art apparatus mentioned above. Moreover, in this inventive apparatus, the intervals between adjacent display dots would not be too expanded or overlapped. There is no plotting of dots at the same coordinate position as the radius of the circle is varied, as is the case with the above-described second prior art apparatus.

By use of the present invention image with a curve can be plotted by dots placed at substantially equal intervals without any redundancy of dots. In addition, since calculation processing is effected by making use of a simplified fraction, calculation system described below, complex circuits for multiplication, square root calculation, etc. are not necessary. Accordingly, both hardware and software can be simplified. Picture image data having excellent display quality can be produced at a high speed that is 1000 or more times faster than the speed of prior art system.

The other objects, features and advantages of the present invention will become more apparent from the following description of a preferred embodiment of the invention taken in conjunction with the accompanying drawings, wherein.

Figure 1:
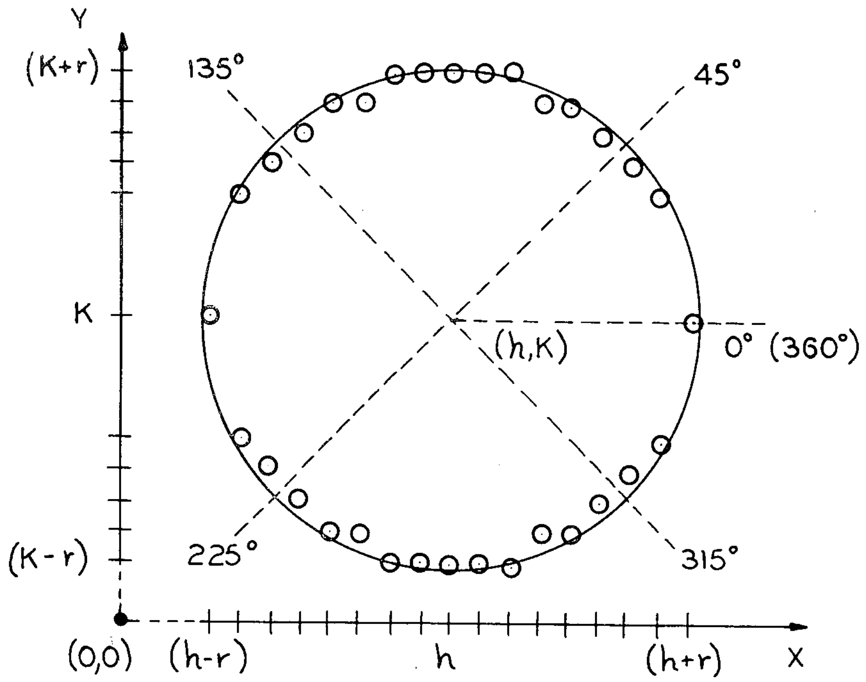
FIG. 1 shows a dot pattern of a circle obtained by the first prior art apparatus employing an equation of a circle, $x^2+y^2=r^2$.

FIG. 1 shows a pattern of a circle having a radius r and a center located at a position of coordinates (h, k), plotted on a CRT display surface according to the first prior art apparatus. It makes use of the equation of a circle $(x-h)^2+(y-k)^2=r^2$. In the illustrated example, a point (h+r, k) is employed as a standard point from which a plotting starts. The y-coordinates are successively calculated while the x-coordinate is varied by −1. As is apparent from this figure, the intervals between the dots displayed in the regions of 0°∼45°, 135°∼225° and 315°∼360° are large, whereas the intervals between the dots displayed in the regions of 45°∼135° and 225°∼315° are small. Accordingly, the pattern of the displayed circle actually generated by this apparatus has a very unnatural apparence. Moreover, since multiplications and square root calculations are required in the calculation of the coordinate data, the image producing speed is very slow.

Figure 2:
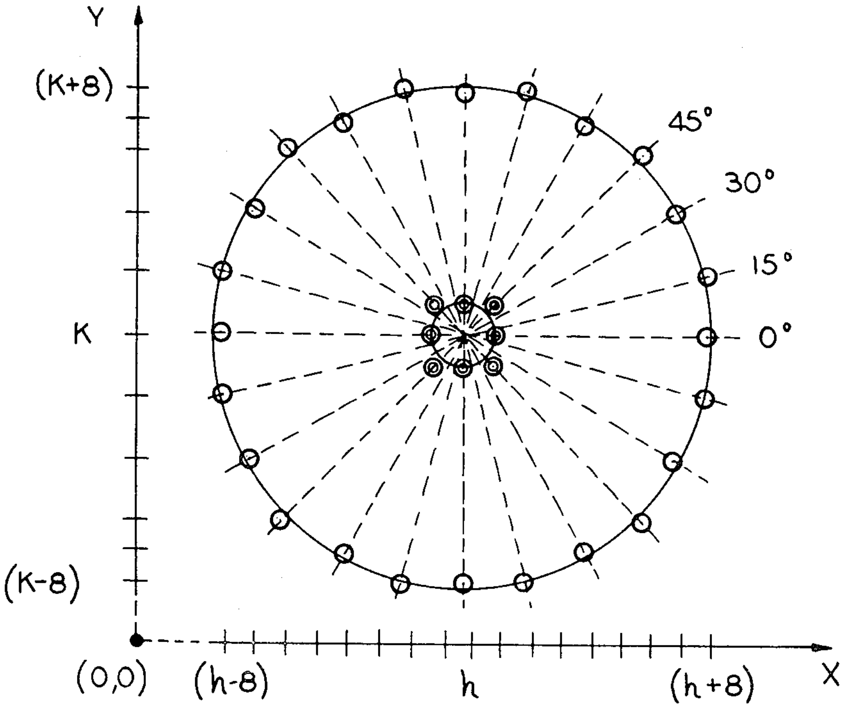
FIG. 2 shows a dot pattern of a circle obtained by the second prior art apparatus employing equations of a circle, $x=r\cdot\cos\theta$ and $y=r\cdot\sin\theta$.

FIG. 2 shows a pattern of a circle having a radius r and a center located at a position of coordinates (h, k) plotted on a similar CRT display surface. The points are plotted at equal angular intervals of 15° according to the second prior art apparatus, that is, by making use of the equations of a circle $x=r\cos\theta+h$ and $y=r\sin\theta+k$.

In FIG. 2, when the circle has a relatively large radius (r=8), it appears as the outer pattern of dots which looks relatively smooth. However, when the circle has a relatively small radius (r=1), it appears as the inner square pattern of dots. The small double circles at each plot point are overlapped and actually represent three dots corresponding to three different values as the angle $\theta$. It is to be noted that of the sampling angular interval is increased, the overlapped plotting for a smaller circle can be avoided. For a larger circle, the interval between adjacent dots is too expanded and hence the plotted pattern cannot be recognized as a circle.

The sampling angular interval may be selected depending upon the radius in order to avoid the above-described difficulty. However, this would make the data processing more complex. Moreover, in this second prior art system also, since trigonometric function calculations as well as multiplications are necessary, a long processing period for plotting a circle is needed since trigonometric function calculations as well as multiplications are necessary.

Figure 3:
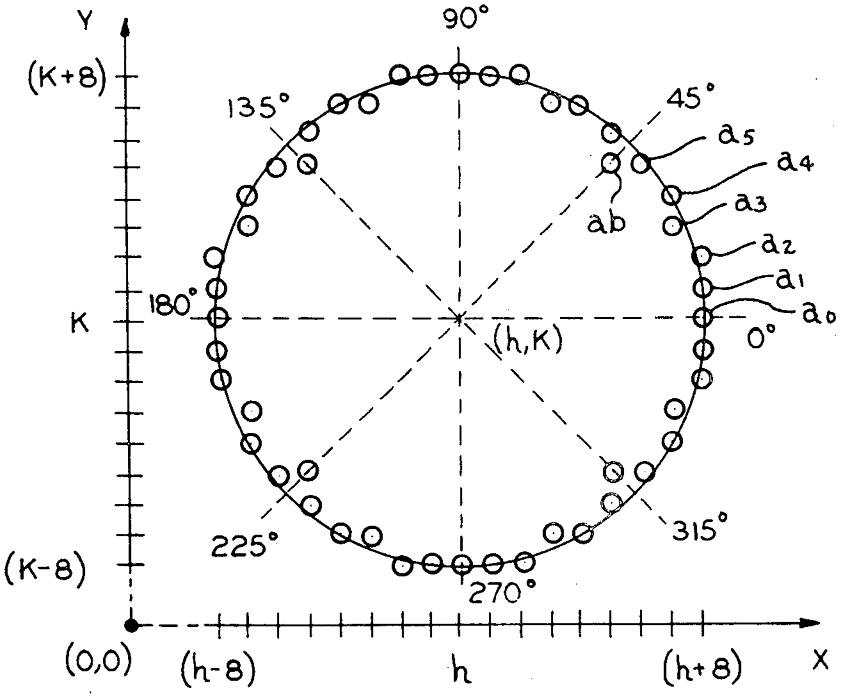
FIG. 3 shows a dot pattern of a circle obtained by the image producing apparatus according to a preferred embodiment of the present invention.

FIG. 3 shows a pattern of a circle plotted on a display surface on the basis of image data prepared according to the present invention. This illustrates a pattern generated by a preferred embodiment of the present invention in which a circle having a radius equal to 8 and center coordinates (h, k) is plotted. In the preparation of pattern data, a circle is imaginarily divided into 8 circular arc sections ($\frac{1}{8}$ of the circumference) each extending over 45 degrees. The plotting position data of the circumference is prepared by changing a standard point and the direction of plotting 8 times for the respective divided circular arcs. This data is fed to a display section to plot the entire circumference.

With regard to the plotting from 315 degrees to 45 degrees (over the first and fifth regions as referred to previously) and 135 degrees to 225 degrees (over the third region as referred to previously), the standard point is selected at the points on the circle at the azimuth angles of 0 degree and 180 degrees with respect to the center. The respective x-coordinate value is computed by calculation, while the y-coordinate value is successively varied by one unit. On the other hand, with regard to the plotting from 45 degrees to 135 degrees (over the second region as referred to previously) and 225 degrees to 315 degrees (over the fourth regions as referred to previously), the standard point is selected at the points on the circle at the azimuth angles of 90 degrees and 270 degrees with respect to the center. The respective y-coordinate value is computed by calculation while the x-coordinate value is successively varied by one unit.

In the following, a description will be made of the algorithm for computing the image data (x- and y-coordinates) in the image producing system according to the present invention. By way of example, the following description is of one preferred embodiment of the invention and a circular pattern plotted by.

As an example, the algorithm for plotting a circular arc extending over the range from 0 degrees to 45 degrees ($\frac{1}{8}$ circle) will be explained. For convenience and simplicity of explanation, it is assumed without losing generality that the center coordinates (h, k) of the circle are (0, 0). In such a case, the equation of the circle is simplified into the following form:

$$x^2+y^2=r^2 \qquad (5)$$

In the case of plotting this particular $\frac{1}{8}$ circle, the x-coordinate data is determined by calculation while the y-coordinate is successively varied by a predetermined increment (for instance "1" ). Modifying Equation (5) above, the following equation is derived:

$$x=\pm\sqrt{r^2-y^2} \quad (6)$$

Here it is to be noted that coordinate data to be used for plotting a dot pattern on a display surface must always be "integers", and in the above-referred region of 0 degree to 45 degrees the integers are positive. Therefore, the value of the x-coordinate determined by Equation (6) is positive. If the calculated value is represented in the form of a difference between an integer I and a fraction F, the x-coordinate is represented as follows:

$$x=\sqrt{x^2-y^2}=I-F \quad (7)$$

It will be readily understood that if the x-coordinate is directly determined by calculating exactly in accordance with Equation (7) above, the integer multiplications are doubled, one integer subtraction and one real number square root calculation are required. However, the plotting used is slow since the real number square root calculation and multiplication require a long calculation time. The plotting speed is slow and hence such a direct calculation is not favored. Therefore, it is contemplated that only the fraction F, in Equation (7) above, is considered in the preferred embodiment. Displacement, in the x-direction or y-direction, of the plotting dot position is determined and thus the coordinates of the dot position to be plotted next are found. According to this process, as will be described later, the image data for designating the coordinates of the dot position to be plotted next can be obtained by only an integer addition and subtraction. Therefore, preparation of image producing data can be achieved at an extremely high speed.

In the dot pattern display, the coordinate is defined generally as an "integer". A continuous locus of a circle can be approximated by a pattern of dots at the positions having integral values of coordinates, and by rounding the square root value derived by Equation (7) above to become an integer. To that end, provision is made such that in Equation (7) if the fraction F is less than ½, the integer I is not varied. If the fraction F is equal to or larger than ½, the integer I is reduced by one unit. In the latter case, in preparation of the next calculation, the fraction F is also reduced by a subtraction of one. That is, in the case when the fraction F becomes equal to or larger than ½, the x-coordinate of the plotting dot data is displaced by −1. In this way, the coordinate data of a circle in each region is normalized.

Accordingly, by modifying Equation (7) to represent the condition for raising a fraction to a whole number for the purpose of rounding, the following condition is derived:

$$F=I-\sqrt{r^2-y^2}\geqq\tfrac{1}{2} \quad (8)$$

Further modifying the above condition, the following relationship is obtained:

$$(r^2-y^2)-(I^2-I+\tfrac{1}{4})\leqq 0 \quad (9)$$

In this region (0°∼45°), the standard point is selected at a point on the circumference and at an azimuth angle of 0 degree with respect to the center, that is, at a point (r, o). Substituting y=0 and I=r into the formula (9), the following relation is derived:

$$r-\tfrac{1}{4}\leqq 0 \quad (10)$$

As the value of r is an integer, it is not objectionable to raise the fraction ¼ to 1 for carrying out integer calculation.

Accordingly, at the standard point, the formula (9) is modified as follows:

$$r-1\leqq 0 \quad (11)$$

This is deemed as a determinent giving a criterion for raising a fraction to a unit. It will be greatly understood that whether the fraction F in Equation (7) above should be raised to unity or lowered to zero can be determined according to the algebraic sign of the left side of the above formula. If r=8 is substituted, then the condition (11) is not fulfilled; hence, the condition (9) is also not fulfilled, and the fraction F is zero at the standard point. On the other hand, in the case where the condition (9) is fulfilled, the condition for raising a fraction to a whole number for rounding is satisfied. In such a case, the integral portion of the x-coordinate is decreased by one. In other words, the display dot is shifted by −1 along the x-axis.

With regard to the criterion for raising a fraction to a whole number, if the left side of the formula (9) is directly calculated, it requires many real number multiplications, and hence the calculation period becomes long. Therefore, according to the present invention, a convenient method for calculation is employed, in which an increment of the left side of the formula (9) between one plot point and the next plot point is calculated through the following single process. The value of the left side of the formula (9) is obtained by repeating the increment. That is, when the left side of the formula (9) is larger than 0 at a given plot point, in the next plot point the x-coordinate is not varied and only the y-coordinate is added by one, and so.

The increment of the left side of the formula (9) between these points can be calculated in a simple manner, as follows:

$$[\{r^2-(y+1)^2\}-\{(I-N)^2-(I-N)+\tfrac{1}{4}\}]-[(r^2-y^2)-\{(I-N)^2-(I-N)+\tfrac{1}{4}\}]=-(2y+1) \quad (12)$$

On the other hand, when the left side of the formula (9) is equal to or smaller than 0, at the next plot point, it is only necessary to reduce the x-coordinate by one and the add one to the y-coordinate. Hence the increment of the left side of the formula (9) between these two points is calculated as follows:

$$[\{r^2-(y+1)^2\}-\{(I-N-1)^2-(I-N-1)+\tfrac{1}{4}\}]-[(r^2-y^2)-\{(I-N)^2-(I-N)+\tfrac{1}{4}\}]=2(I-N)-(2y+1)-2 \quad (13)$$

In Equations (12) and (13), a parameter N represents the number of variations of the integral value of the x-coordinate subsequent to the start of plotting.

Figure 4:
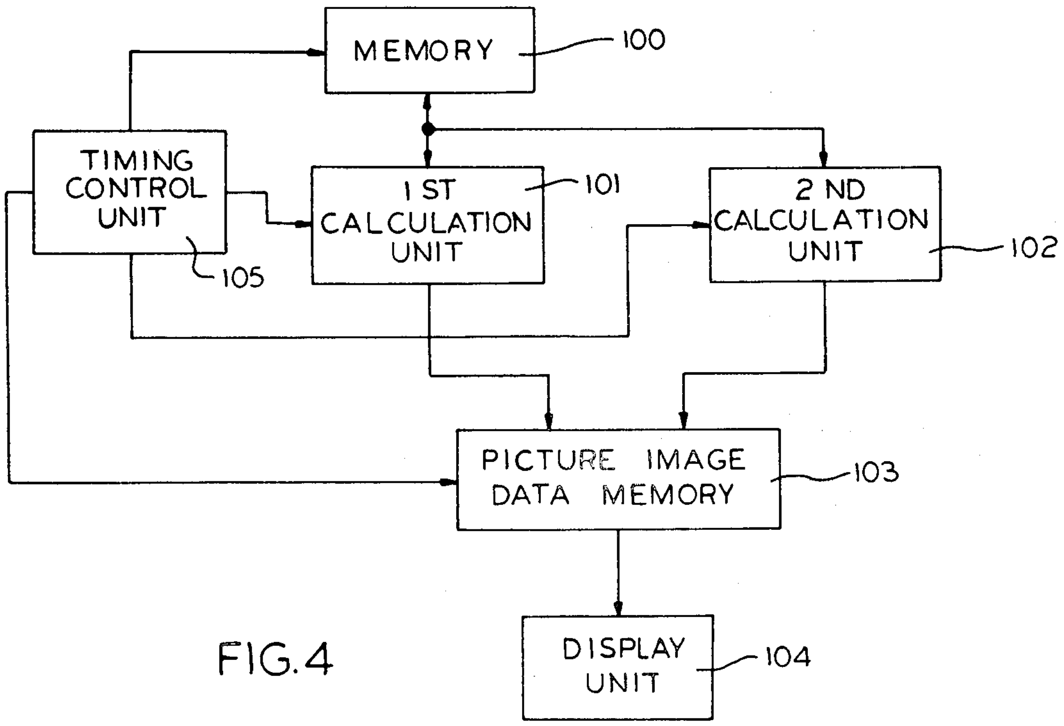
FIG. 4 is a block diagram of an image producing apparatus according to a preferred embodiment of the present invention.

FIG. 4 shows an outline of the image producing system according to the present invention, in a block form. In this figure, a memory 100 includes a plurality of registers or the like, and coordinates of standard points with respect to the image to be produced. These coordinates are transmitted from a CPU or an external memory to this memory 100 to be stored therein.

The data stored in the memory 100 is selectively transmitted to a first arithmetic unit 101 for calculating the x-coordinate through the above-described simplified process. The y-coordinate is successively varied by a predetermined value. Alternatively, the y-coordinate may be sent to a second arithmetic unit 102 for calculating the y-coordinate through a similar process, while the x-coordinate is successively varied by a predetermined value. The results of the calculations in the respective arithmetic units are stored in an image data storage memory 103, such as a video RAM.

It is to be noted that during the calculation itself the data, such as the determinant (9) serving as a criterion for raising a fraction to a whole number for rounding a number, is temporarily stored in a predetermined location of the memory 100. The image data are transferred from the memory 103 to a display unit 104 where they are converted into a video signal, and thus as display of a desired circle or circular arc can be achieved. Reference numeral 105 designates a control unit for generating signals for controlling timing at various portions of the system.

The data to be stored in the memory 100 will now be described in more detail. The circle is divided into imaginary regions (first to fifth regions), for instance. In the case of preparing data of an image to be displayed in the first region (0°–45°), the initial values of the x- and y-coordinates the coordinates $x=h+8$ and $y=k$ are preset in the memory 100. This memory means 100 is shown in detail in FIG. 5, where there are a number of registers 1–6 which store data, and therefore act as memories. As before, for simplicity of explanation, the coordinates (h, k) of the center of the circle to be plotted are assumed to be (0, 0). Hence, $x=8$ and $y=0$ are set in an X-register and Y-register, respectively, in the memory 100. The determinant D (formula (9)) serves as a criterion for raising a fraction to a whole number for rounding a number. Upon starting the plot, the value $r-1=7$ obtained from the formula (11) is preset in a D-register in the memory 100. Representing by $D_1$, the increment of the determinant D is calculated by Equation (12) when the condition (9) is not fulfilled. Upon starting the plot, $y=0$ is substituted into Equation (12), and the derived increment $D_1=-1$ is set in a $D_1$-register in the memory 100. Furthermore, an additional increment of the determinant D, which is to be added when the determinant D (formula (9)), is equal to or smaller than 0. That is, the calculated value for the formula $2(I-N)-2$, which is the difference of Equation (13) minus Equation (12), is represented by $D_2$. The value $D_2$ is set in a $D_2$-register in the memory 100. Upon starting the plot, since $N=0$ and $I=r$ is fulfilled, the additional increment $D_2$ is equal to $2(r-1)$. The value of N in the formula $2(I-N)-2$ is increased by "one" each time that the integral value of the x-coordinate is varied. Hence, in the $D_2$-register the previous value of $D_2$ is reduced by "2" each time the integral value of the x-coordinate is varied.

Figure 5:
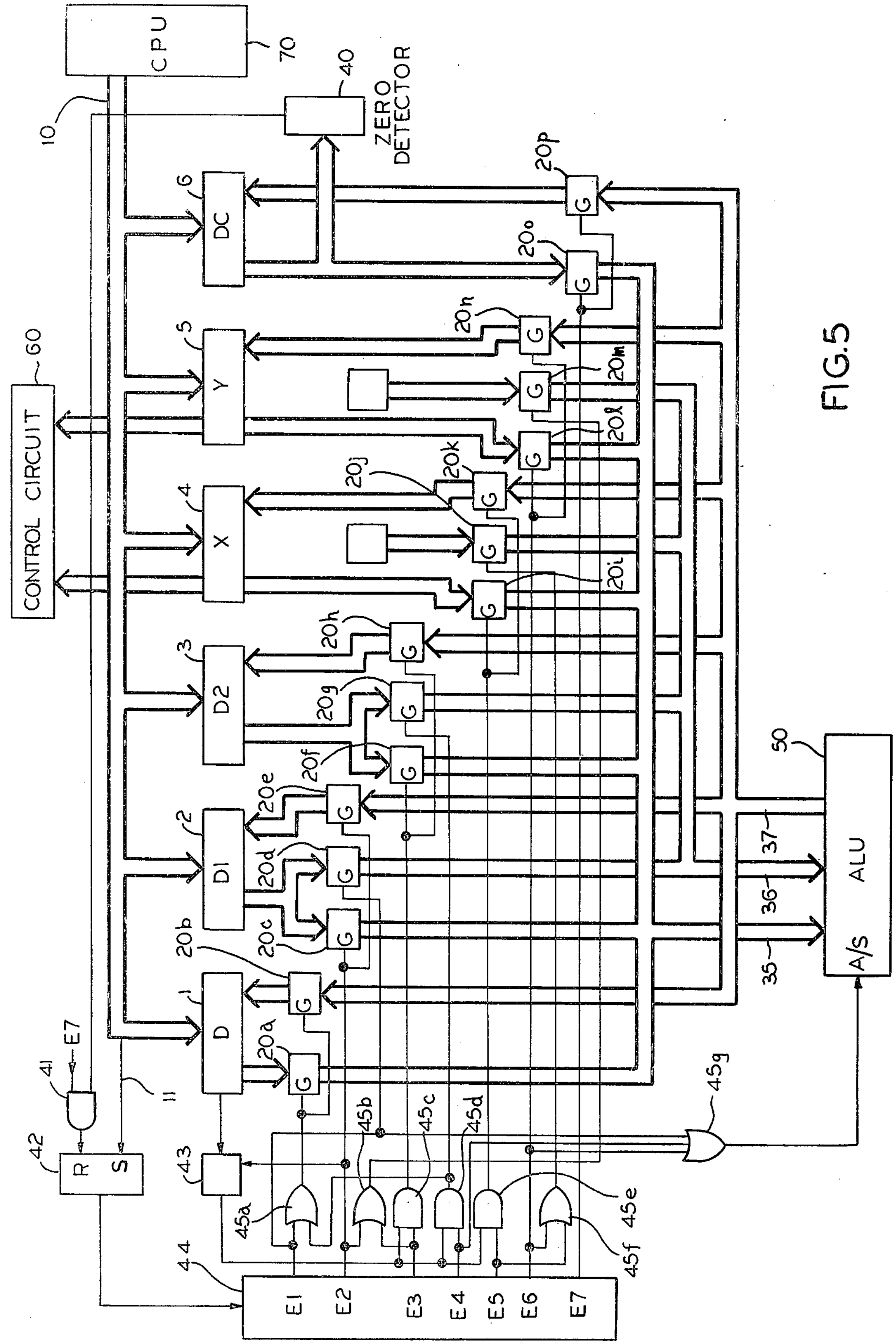
FIG. 5 is a circuit block diagram of a part of a plotting, data processing circuit in the image producing apparatus according to a preferred embodiment of the present invention.

FIG. 5 is a block diagram of a plotting data processing circuit in the image producing apparatus according to the present invention. Instructions and parameters transmitted from a CPU 70 are passed through a data-control bus 10 and set in a D-register 1, $D_1$-register 2, $D_2$-register 3, X-register 4, Y-register 5 and DC-register 6. In addition, when a draw start instruction is issued, a control signal is applied through a signal line 11 to a drawing signal generator (flip-flop) 42, to excite the flip-flop. Blocks 20$_a$ to 20$_p$ respectively represent a group of switching gates, each of which is opened when a G-input becomes "1" (a logic H level). Whereas, when the G-input becomes "0" (a logic L level), the gate is closed.

Reference numerals 35, 36 and 37 designate a data bus of a 3-bus type leading to an arithmetic-logic unit (ALU) 50. A first operand is transferred through the bus 25, a second operand is transferred through the bus 36 and a result of the operation in the ALU 50 is transferred through the bus 37. The ALU 50 performs an addition when a signal is applied through an OR-gate 45*g* to a terminal A/S is "1", and performs a subtraction when the signal is "0".

Figure 6:
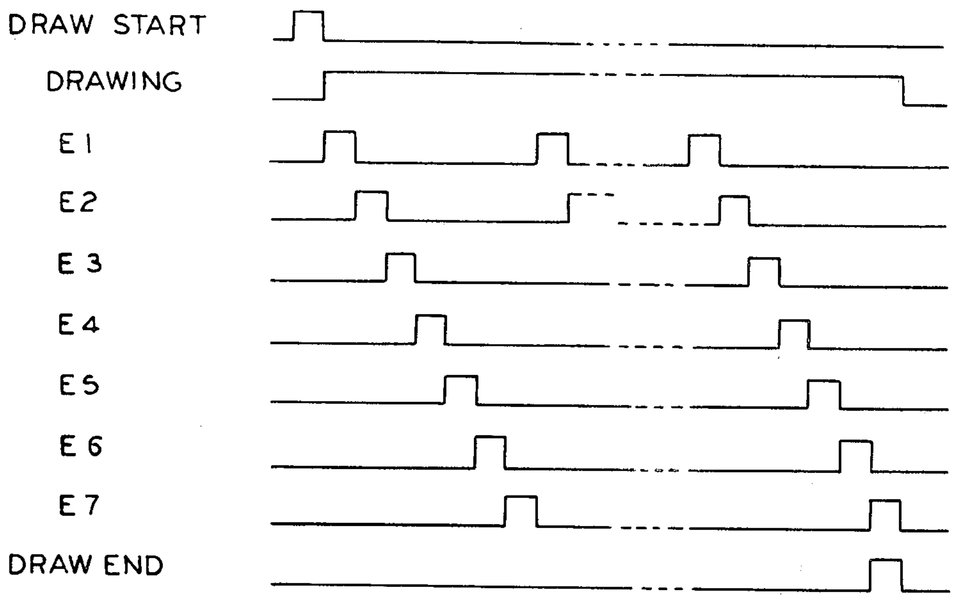
FIG. 6 is a timing chart showing timing signal waveforms to be used in the circuit shown in FIG. 5.

The drawing signal generator 42 is activated to issue an output (DRAWING) by a control signal (DRAW START) transferred through the signal line 11 when a draw start instruction is issued from the CPU 70. Generator 42 becomes inactivated when a reset signal fed from an AND-gate 41 becomes "1". The output of the drawing signal generator 42 is applied to a drawing timing signal generator 44, in which timing signals E1 to E7 illustrated in FIG. 6 are successively generated.

Reference numeral 40 designates a zero detector circuit. Its output becomes "1" when all the bits of the content in the DC-register 6 become "0". Its output is transferred to one input terminal of an AND-gate 41. The other input terminal is applied with the drawing timing signal E7. Accordingly, when both of the inputs of gate 41 become "1", a DRAW END signal (see FIG. 6) appears at the output of the AND-gate 41 (i.e., the output becomes "1" to deactivate the drawing signal generator 42).

A flip-flop 43 stores the positive or negative sign of the content in the D-register when the timing signal E2 is generated. The output of the flip-flop 43 is applied to AND-gates 45*c*, 45*d* and 45*e* to produce gate control signals for controlling various gates in FIG. 5 to achieve desired arithmetic operations. Blocks 30 and 31, respectively, denote data generator circuits, which generate data "1" and data "2", respectively. Reference numeral 60 designates a control circuit, to which are applied the plot position coordinates (x, y) calculated by the plot data processing circuit in FIG. 5, to execute drawing in the display unit.

Now a description will be made on the operation of the circuit shown in FIG. 5. When a parameter set instruction and a draw start instruction are issued from the CPU 70, a DRAW START signal is transferred through the signal line 11. The output of the drawing signal generator 42 is thereby turned to "1". As a result, drawing timing signals E1 to E7 are successively generated from the drawing timing signal generator 44. Unless the contents of the DC-register are all "0", the output of the AND-gate 41 (DRAW END) is held "0" when the timing signal E7 is at the H level. As a result, the drawing timing signals E1 to E7 are generated continuously. Under such a condition, the drawing procedure is continued. When the timing signal E7 is at the H level, and if the contents of the DC-register are all "0", the output signal (DRAW END) from the AND-gate 41 is turned to "1". This DRAW END signal resets the drawing signal generator 42 and the drawing is terminated.

Next, the operation of the circuit will be explained, by way of example, in connection to execution of the calculation "$D+D_1 \rightarrow D_1$" to be executed at the drawing timing E1. When the drawing timing signal $E_1$ is output, both the outputs of the OR-gates 45*a* and 45*g* become "1". The switching gates 20$_a$, 20$_b$ and 20$_d$ are activated, that is, opened, and the ALU 50 is prepared to execute an addition. Therefore, the contents of the D-register 1 are output on the bus 35, while the contents of the $D_1$-register 2 are output on the bus 36. They are input to the ALU 50 through these data bus. The output of the ALU 50, that is, the result of calculation "$D+D_1$" is stored in the D-register 1 via the bus 37 and the switching gate 20*b*, and thus the operation of "$D+D_1\rightarrow D$" is completed. The operations at the timing E2 and the subsequent timings are executed in a quite similar manner to the above-described operation at the timing E1.

Now the procedure for preparing image data of a circle executed through the above-described circuit operations will be explained with reference to flow charts shown in FIGS. 7 and 8.

Figure 7:
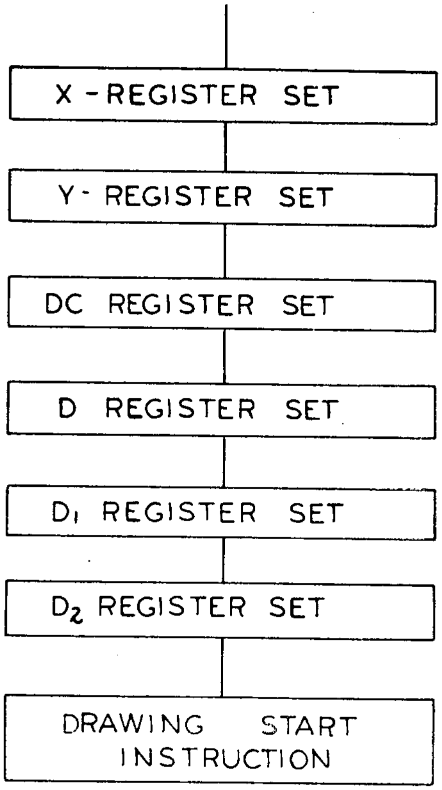
FIG. 7 is a flow chart showing a mode of initial setting for plotting a circle according to a preferred embodiment of the present invention.

As shown in FIG. 7, upon the start of the preparation of the image data, the above-described initial data are respectively set in the X-register 4, Y-register 5, DC-register 6, D-register 1, $D_1$-register 2 and $D_2$-register 3, in succession. Thereafter, in response to a drawing start instraction, the processing for producing image data is executed under a timing control, according to the flow chart shown in FIG. 8.

Figure 8:
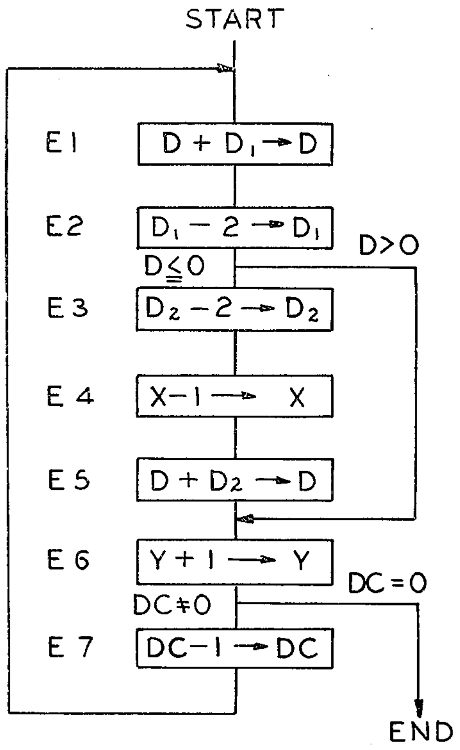
FIG. 8 is a flow chart showing a process for plotting a first portion of a circle according to a preferred embodiment of the present invention; and FIGS. **9*a*–9*g*** are flow charts showing a process for plotting the second portion of a circle according to the present invention.

By way of example, it is now assumed that the image data of a circle to be drawn in the region of 0° to 45° are calculated according to the flow chart shown in FIG. 8. At first, the standard data (in this case $x=h+8$ and $y=k$) set in the X-register 4 and Y-register 5 are transferred to the control circuit 60 as image data for displaying a dot $a_0$ in FIG. 3. In the subsequent description, for simplicity of explanation, it is assumed that the center (h, k) of the circle is located at the origin (0, 0) of the x-y coordinate system. Then, in response to the timing signal E1, the contents of the D-register 1 and $D_1$-register 2 are added together in the ALU 50. At this moment, since $D=r-1=7$ and $D_1=-(2y+1)=-1$ (therefore $y=0$) are added together. The result of addition is $D+D_1=7-1=6$, and the value 6 is newly set in the D-register 1. Further, in response to the timing signal E2, the contents of the $D_1$-register 2 are added with (−2). Therefore, (−3) is newly set in the $D_1$-register 2.

Then, since the value of the determinant D is $D=6>0$, the process jumps to the processing routine responsive to the timing signal E6. This period is the period for executing the processing so that the contents of the Y-register 5 are increased by +1, so that $y=1$ is newly set in the Y-register 5, in preparation to the production of the next image data. On the other hand, DC-register 6 is preset to the number of dots to be drawn in the range of 0°-45°, which is now assumed to be 7. Each time image data for one dot is produced, the contents of the DC-register 6 are reduced by one. For instance, a ring counter may be used as the register, and the count therein is set at 6 during the period of the timing signal E7.

Now, when the content of the D register becomes less than zero, the content of the $D_2$ register is decreased by "2" at the timing signal E3. Successively, the content of the X register is decreased by "1" at timing signal E4, and the content of D register is added to the content of $D_2$ register at the timing signal E6. Further, at the timing signal E6, the content of Y register is increased by "1". At this point, if the content of DC register is zero, the calculation of 0°–45° is ended. However, if the content of DC register is not zero, it is decreased by "1" at the timing signal E7.

Next, again it returns to the timing signal E1, and the calculation is commenced to find the x-coordinate corresponding to the y-coordinate added by "+1", $y=1$. The procedure is the same as the above-described procedure, and such procedure is repeatedly executed. At the respective timings E1 to E7, addition or substraction is executed as shown in FIG. 8. At the ends of the timing signals E2 and E6, the processing to be executed next is determined by checking the contents of the D-register 1 and DC-register 6, respectively. As will be apparent from FIG. 8, all of this processing consist of simple addition/subtraction calculations.

Figure 9A:
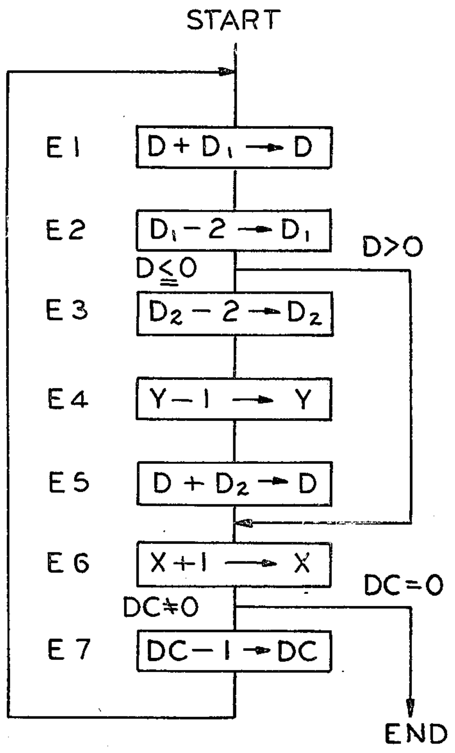
Figure 9B:
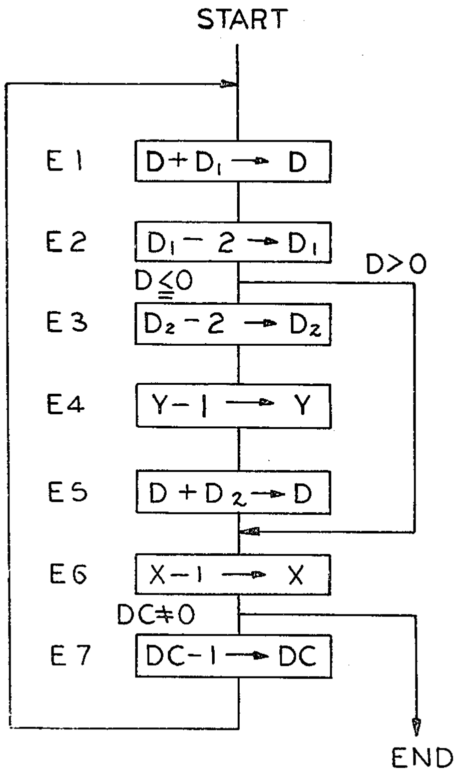
Figure 9C:
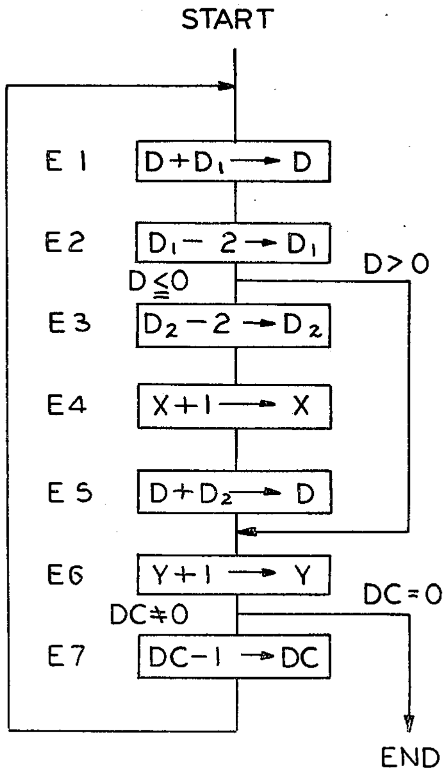
Figure 9D:
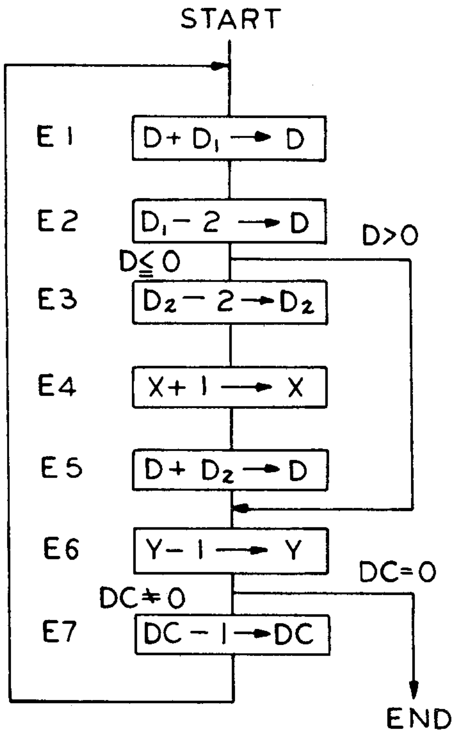
Figure 9E:
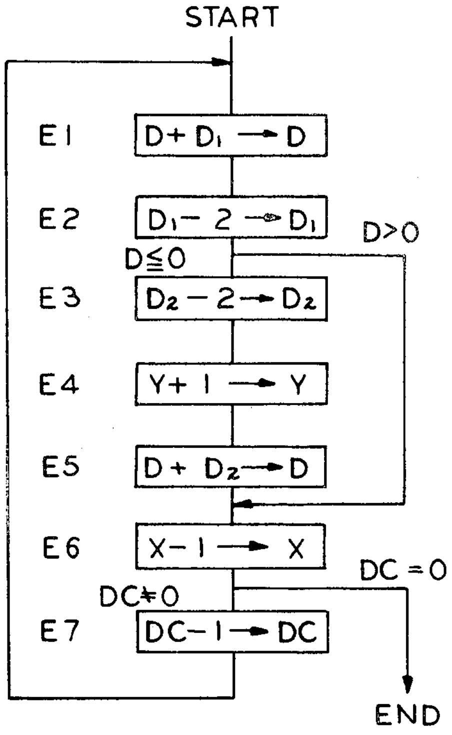
Figure 9F:
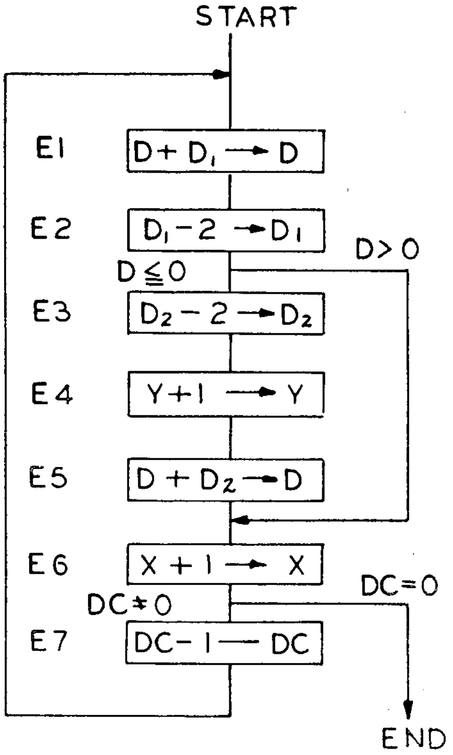
Figure 9G:
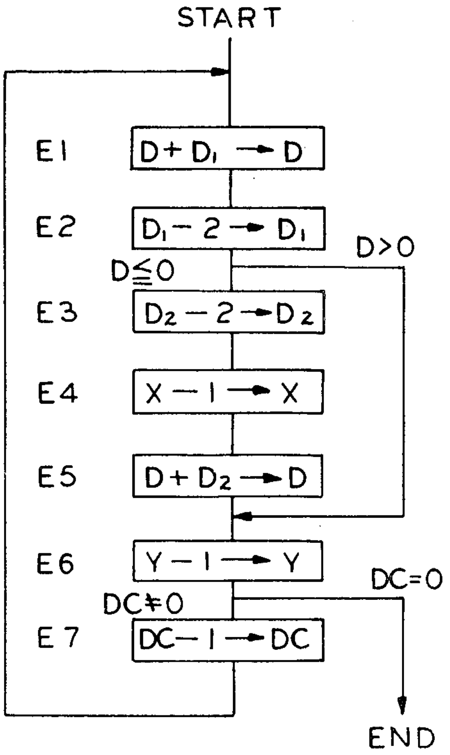

By successively executing such processing, coordinate data for representing the respective positions of the dots $a_0$ to $a_6$ in FIG. 3 are produced and successively stored in the control circuit 60. In the region of 45°–90°, the processings at the timing signals E4 and E6 are modified to "$Y-1\rightarrow Y$" and "$X+1\rightarrow X$", respectively, as shown in FIG. 9*a*. In the reminder of the process, the same processing is executed. Further, in the region of 90°–135°, the processings at the timings E4 and E6 are modified to "$Y-1\rightarrow Y$" and "$X-1\rightarrow X$" as shown in FIG. 9*b*. In the region of 135°–180°, the processings at the timing signals E4 and E6 are modified to "$X+1\rightarrow X$" and "$Y+1\rightarrow Y$", as shown in FIG. 9*c*. In the region of 180°–225°, the processings at the timings E4 and E6 are modified to "$X+1\rightarrow X$" and "$Y-\rightarrow Y$", as shown in FIG. 9*d*. In the region of 225°–270°, "$Y+1\rightarrow Y$" and "$X-1\rightarrow X$" are executed at the timing signals E4 and E6, respectively, as shown in FIG. 9*e*. Further, in the region of 270°–315°, "$Y+1\rightarrow Y$" and "$X+1\rightarrow X$" are executed at the timing signals E4 and E6, respectively, as shown in FIG. 9*f*. In the region of 315°–360°, the processings at the timings E4 and E6 are modified to "$X-1\rightarrow X$" and "$Y-1\rightarrow Y$", respectively, as shown in FIG. 9*g*.

In order to execute these processings, the only thing which can be done is to modify the control signals for gate circuits 20*i*, 20*j*, 20*l*, 20*h* and 20*n* and the A/S control signal. Therefore, almost all circuits of FIG. 5 can be used as the processings in FIGS. 9*a*–9*g*.

In this way, image data, that is, coordinate data for the entire circumference of a circle are all compiled and stored in the control circuit 60. This data is transferred to a display unit as synchronized with the display timing in the display unit.

In the above-described embodiment of the present invention, a circle is divided into four regions. In the respective regions of 45°–135°, 135°–225°, 225°–315° and 315°–45° the standard points are selected at the ends of the diameters of the circle which are parallel to the x-axis and y-axis of the coordinate system. While the x-coordinate or y-coordinate of the plot point is successively varied by a predetermined increment, the corresponding y-coordinate or x-coordinate, respectively, is calculated by making use of the simplified fraction calculation system as illustrated in FIG. 8. In this particular, the increment is equal to "1". Therefore, even if the radius of the circle or circular arc to be drawn is varied, the figure can be approximated by a dot pattern consisting of dots arranged at substantially equal intervals. Accordingly, for a drawn circle having a small diameter, overlapped plotting of dots do not occur at the same coordinate point, as often occurred in the prior art systems. Moreover, for a drawn circle having a large diameter, the intervals between adjacent dots would not be expanded. In other words, a high quality circle can be drawn.

In addition, as will be apparent from FIG. 8, an original simplified fraction calculation method is employed in the calculation for producing position data of a circle. There is no need to use operations requiring a long calculation period such as square root calculation, multiplication, division, etc. The calculation can be achieved by only simple addition and subtraction. Therefore, the drawing speed can be reduced by a factor of about 100 to 1000 as compared to the prior art system.

It is to be noted that it is possible to draw either the entire circumference of a circle or a circular arc forming any part of the circle according to the above-described embodiment. However, it is necessary to preliminarily define in what region of a circle the circular arc to be drawn is located. This definition is very simple though. It is only necessary, for example, to define the number of dots to be displayed in the respective regions, and to check the number of produced dot data each time they have been produced according to the flow chart in FIG. 8. When the number has reached a predetermined value the operation is stopped or the setting of the region is changed. Alternatively, only desired data could be transferred to the control circuit 60 by additionally providing a mask register.

Description has been made above, by way of example, in connection to drawing of a circular arc extending over 0 degree to 45 degrees in an azimuth angle. A similar control process could be employed in another angular region also. That is, the coordinate data for drawing in another region can be produced by interchanging the positions of operations for selecting the X-register data and Y-register data and modifying the addition or subtraction for the X-register data and Y-register data.

While the x-coordinate value and y-coordinate value are determined by calculation in the above-described embodiment, a similar effect can be achieved by preliminarily storing coordinate information of a circle or a circular arc in a memory and determining by calculation the addresses of the memory where the necessary data is stored. In addition, if the standardized increment of the x-coordinate or y-coordinate is changed to a value other than "1", for instance, to other integers such as "2" or "3". Then the intervals between adjacent dots on a circumference can be changed arbitrarily.

Furthermore, although the effects and advantages of the present invention are most remarkable when it is applied to a drawing of a circle or a circular arc, the inventive concept is equally applicable to drawing of other curves. For instance, an ellipse or a hyperbola can be drawn having its orthogonal axes directly toward the x- and y-axes of the coordinate system.

It is only necessary to divide the curve into four regions, similar to the case of a circle, and to calculate the y-coordinate and x-coordinate, respectively, according to a predetermined calculation process. While the x-coordinate is successively varied by a predetermined increment in certain regions and the y-coordinate is successively varied by a predetermined increment in the remaining regions. As a result, a pattern can be drawn with display dots arranged at substantially equal intervals without producing intervals which are too narrow or too broad between display dots.

Moreover, the simplified fraction calculation method employed in the above-described embodiment is equally applicable to calculation of x-coordinates or y-coordinates according to the equations $x^2/a^2+y^2/b^2=1$ (ellipse) and $x^2/a^2-y^2/b^2=1$ (hyperbola). In this case also, approximated integer values for the respective coordinates can be obtained through simple operations mainly consisting of additions and subtractions.

In addition, periodic curve can be drawn extending to the plus and minus infinity such as sine curves and cosine curves can be executed. A section of the curve corresponding to one period can be taken as a basic finite curve and divided into a plurality of regions, then the effects and advantages of the present. Furthermore, by repeatedly shifting the drawn curve section for the remaining periods of the original curve, the curve can be drawn continuously over any desired extent.

Furthermore, in this invention standard point is defined as a plot start point. However, this standard point may alternatively be defined as a calculation start point since the image data can be read out from the video memory at random.

What is claimed is:

1. An image producing apparatus comprising:

a memory device having a first memory means for storing standard data representing a starting point of an image to be plotted on a plane having an X-axis and a Y-axis intersecting each other at the right angles, second memory means for storing a number of dots to be plotted in a predetermined angle, third memory means for storing data (−2y−1) representing variation of a decimal fraction operation, a fourth memory means for storing a data (2I−−2N−−2) representing a part of said decimal fraction operation where I is a radius and N is the number of variations in an X-coordinate value or a Y-coordinate value, fifth memory means for storing data (r−1) used by said decimal fraction operation; and means coupled to said memory device for producing data representing points which are to be plotted on said plane according to timing control signals, said data producing means having means for adding said data (r−1) to said data (−2y−1);

means for subtracting a value 2 from said data (r−1);

means for subtracting a value 2 from said data (2I−−2N−−2);

means for adding a content of said fifth memory means to a content of said fourth memory means;

means for counting a content of said second memory means; and means for changing a X-coordinate value and a Y-coordinate value.

2. The image producing apparatus as claimed in claim 1, further comprising display means and means for transferring the data representing points to be plotted to said display means.

3. The image producing apparatus of claim 1, wherein each of said first to fifth memory means is a register for storing data.

4. The image producing apparatus of claim 3 and timing signal generator means for generating said timing control signals.

5. The image producing apparatus of claim 4 wherein said means coupled to said memory means for producing data comprises a system of gate means which are sequentially operated responsive to individual ones of said timing control signals.

6. The image producing apparatus of claim 5 and arithmetic logic unit means having at least addition and subtraction capabilities, said arithmetic logic unit being coupled to said first through fifth memory means via said system of gate means.

7. The image producing apparatus of claim 6 wherein the named means for subtracting, adding, and counting comprises the configurations and reconfigurations of said gating system and associated wires responsive to selective operations of said system of gate means under the control of said timing control signals.

* * * * *